US012779277B2

(12) United States Patent
Hansen

(10) Patent No.: US 12,779,277 B2
(45) Date of Patent: Nov. 3, 2026

(54) TORQUE RESISTANCE MECHANISM OF A MULTIFUNCTIONAL EXERCISE APPARATUS

(71) Applicant: Danish Aerospace Company A/S, Odense SV (DK)

(72) Inventor: Daniel Hasse Hagen Hansen, Odense SV (DK)

(73) Assignee: Danish Aerospace Company A/S, Odense SV (DK)

(*) Notice: Subject to any disclaimer, the term of this patent is extended or adjusted under 35 U.S.C. 154(b) by 147 days.

(21) Appl. No.: 18/917,065

(22) Filed: Oct. 16, 2024

(65) Prior Publication Data

US 2025/0032845 A1 Jan. 30, 2025

Related U.S. Application Data

(63) Continuation of application No. 18/341,998, filed on Jun. 27, 2023, now Pat. No. 12,303,737, which is a (Continued)

(30) Foreign Application Priority Data

Nov. 28, 2018 (DK) ............................. PA201870784
Nov. 28, 2018 (DK) ............................. PA201870785

(Continued)

(51) Int. Cl.
*A63B 21/00* (2006.01)
*A63B 21/015* (2006.01)

(Continued)

(52) U.S. Cl.
CPC ...... *A63B 21/153* (2013.01); *A63B 21/00069* (2013.01); *A63B 21/015* (2013.01); *A63B 21/225* (2013.01); *B64G 1/60* (2013.01)

(58) Field of Classification Search
CPC ............ A63B 21/153; A63B 21/00069; A63B 21/015; A63B 21/225; A63B 21/025;

(Continued)

(56) References Cited

U.S. PATENT DOCUMENTS 4,674,741 A * 6/1987 Pasierb, Jr. ............ A63B 24/00 482/72
6,015,368 A 1/2000 Clem (Continued)

FOREIGN PATENT DOCUMENTS

WO WO-2007015096 A2 * 2/2007 ......... A63B 21/0054
WO WO-2024134605 A1 * 6/2024 ............. A63B 21/15

OTHER PUBLICATIONS

Office Action dated Nov. 15, 2024 from U.S. Appl. No. 18/341,998.

*Primary Examiner* — Andrew M Kobylarz
(74) *Attorney, Agent, or Firm* — Crockett & Crockett, PC; K. David Crockett, Esq.

(57) ABSTRACT

A multifunctional exercise apparatus for exercise of humans, in particular astronauts, said apparatus including a first module comprising a cable reel system operably connected to a torque resistance mechanism, and a second module comprising a flywheel and a brake for providing resistance to the flywheel. The ability provided by the present invention for developing exercises in which the flywheel and a brake in combination with the torque resistance mechanism provides for further possibilities for training body joints and muscle groups.

9 Claims, 14 Drawing Sheets

Related U.S. Application Data continuation of application No. 17/290,866, filed as application No. PCT/DK2019/050365 on Nov. 27, 2019, now Pat. No. 11,724,151.

(30) Foreign Application Priority Data

Nov. 28, 2018 (DK) ............................ PA201870786
Nov. 28, 2018 (DK) ............................ PA201870787

(51) Int. Cl.
*A63B 21/22* (2006.01)
*B64G 1/60* (2006.01)

(58) Field of Classification Search
CPC ........ A63B 23/0476; A63B 2022/0079; A63B 2022/0652; A63B 2023/0411; A63B 2071/027; A63B 21/0058; A63B 21/045; B64G 1/60
See application file for complete search history.

(56) References Cited

U.S. PATENT DOCUMENTS

| | | | | |
|---|---|---|---|---|
| 7,524,272 | B2 * | 4/2009 | Bruck | A63B 22/02 482/54 |
| 11,998,795 | B2 | 6/2024 | Zhu | |
| 12,208,304 | B2 * | 1/2025 | Akeel | A63B 21/00076 |
| 12,409,359 | B2 * | 9/2025 | Andrews | A63B 21/153 |
| 12,605,584 | B2 * | 4/2026 | Zheng | A63B 21/153 |
| 2007/0049470 | A1 | 3/2007 | Pyles | |
| 2024/0261622 | A1 * | 8/2024 | Wilson | A63B 21/153 |

* cited by examiner

TORQUE RESISTANCE MECHANISM OF A MULTIFUNCTIONAL EXERCISE APPARATUS

This application is a continuation of U.S. application Ser. No. 18/341,998, which is a continuation of U.S. Application Ser. No. 17/290,866, filed May 3, 2021, which is a national stage of International Application PCT/DK2019/050365, which claims priority to Danish Applications DK201870784 filed Nov. 28, 2018, DK201870785 filed on Nov. 28, 2018, DK201870786 filed on Nov. 28, 2018 and DK201870787 filed on Nov. 28, 2018.

TECHNICAL FIELD

The disclosure relates to a multifunctional exercise apparatus for exercise of human beings, in particular astronauts. The multifunctional exercise apparatus is useful for training various body joints and muscle groups while the astronauts are in micro gravity for extended time periods.

BACKGROUND

In micro gravity appearing in space, muscles are in the slack state all the time, which accelerate the muscular atrophy. Therefore, astronauts and space tourists need to exercise when they are on a mission.

Earth-bound exercise apparatus usually applies actual weights to provide resistance for the user. However, in micro gravity it is necessary to obtain the resistance in other ways such as stretchable cords, pneumatic cylinders electric brakes, torque bands etc.

A multifunctional exercise apparatus is disclosed in US 2014/0213414, which uses a pneumatic actuated resistance mechanism. The user interacts with the apparatus by grasping a bar connected to the pneumatic actuated resistance mechanism. In an alternative embodiment disclosed in US 2018/0021614 the resistance mechanism is an electric resistance mechanism selected from a group consisting of a linear actuator brake, a linear actuator electromechanical brake, a linear actuator friction disc brake, a stepper motor brake, a servo motor brake, a servo motor electromagnetic brake, a servo motor friction disc brake, and an electric particle brake.

Due to weight and space constraints a limited number of exercise apparatuses can be brought on board a space ship. Furthermore, some of the resistance mechanism has a very large size and mass. Thus, the astronauts are limited in the variety of exercise types.

SUMMARY

It is an object of the present invention to provide a multifunctional exercise apparatus for exercise of humans, in particular astronauts, said apparatus comprising a first module comprising a cable reel system operably connected to a torque resistance mechanism, and a second module comprising a flywheel and a brake for providing resistance to the flywheel, wherein the first and the second module can be arranged in at least a first position and a second position relative to each other, so that in the first position the torque resistance mechanism of the first module is operably connected to the flywheel of the second module, and in a second position the torque resistance mechanism of the first module is operated independently of the flywheel, when a user pulls a cable of the cable reel system.

A cable reel system connected to a torque resistance mechanism is particularly useful for resistive exercises such as weight lifting, whereas a flywheel connected to a brake for providing resistance to the flywheel is particularly useful for endurance exercises such as cycling and rowing. The ability provided by the present invention for developing exercises in which the flywheel and a brake in combination with the torque resistance mechanism provides for further possibilities for training body joints and muscle groups. Notably, it has been found that the rowing experience more closely resembles a boat sliding through a water surface and a Concept2 rowing machine when the two types of resistance are combined as the flywheel generates inertia and the torque resistance mechanism creates a constant force.

In an embodiment of the invention the torque resistance mechanism is connected to a first part of a coupling mechanism, and the flywheel is connected to a second part of the coupling mechanism, thereby enabling an operable connection when the first and the second part of the coupling mechanism are engaged. In a preferred aspect the first part and the second part of the coupling mechanism are first hub and second hub, respectively, to be engaged using a common axle. The first and second hub may be provided with grooves parallel to the axis, wherein the grooves correspond to ridges provided in the common axle.

In an implementation of the present invention the first module and the second module are connected by a hinge, for allowing the multifunctional exercise apparatus to be moved between the first and second position. The hinge allows for a relative fast shift between positions thereby allowing the user to feel an unimpeded training experience.

In an embodiment of the invention the hinge is a double hinge allowing a surface of the first module to flush with a surface of the second module. The even platform formed by the surfaces of the first and the second module allow the user to stand on the platform for performing various exercises.

In an implementation of the invention the first module and the second module can be arranged in a third position in which a main extent of the first module is perpendicular to a main extent of the second module. The third position allows for using the flywheel and brake as resistance for cycling.

When the multifunctional exercise apparatus according to the present invention is transformed to the ergometer mode, usually, the second hub is provided with a through-going axle fitted with pedal arms and pedals at each end in the third position. Preferably, the second hub is provided with grooves parallel to the axis, wherein the grooves correspond to ridges provided in the throughgoing axle.

For improving the usability of the multifunctional exercise apparatus it may be provided with engaging means for accommodating a seat post. Usually, the engaging means are provided on the second module for allowing the provision of a seat post to be used during endurance exercises such as cycling and rowing. The seat post may comprise an adjustable tube engaged at one end with the engaging means and provided in the other end with a seat.

In an embodiment of the invention the brake comprises a braking band arranged around a portion of the perimeter of the flywheel and a tension adjusting mechanism allowing adjustment of the tension of the braking band.

For guiding the cables between the cable reel system and the user, swivels are usually applied. In an implementation of the invention the first module is provided with a swivel for accommodating the cable of the reel. In another embodiment of the invention two swivels are provided at each end of the platform provided by a surface of the first module to flush with a surface of the second module.

The invention also relates to a cable reel system for a multifunctional exercise apparatus, the cable reel system comprising two cable reels rotatably journaled on a shaft, two ring gears and at least two pinion gears, wherein one of the two ring gears is connected to one of the two reels, the other of the two ring gears is connected to the other of the two reels, the two ring gears face one another with the at least two pinion gears arranged between the two ring gears with the at least two pinion gears each meshing with both of the two ring gears, and the shaft is provided with a pinion gear carrier for each of the at least two pinion gears.

The cable reel system allows the two independent cables to be driven by a single motor. The differential setup of the reels means that the cables will follow the axle with a 1:1 ratio if both cables are used at the same time. If only a single cable is used and the other is left unused, the cable will follow the axle in a ratio of 2:1. The cable reel system allows the reels to rotate independently of the axle and as a result, the torque on the axle will be divided equally between each reel.

In an implementation of the invention, the pinion gear carriers extend from the shaft in a radial direction, said pinion gear carriers being provided at their distal end with one of the at least two pinion gear rotatably journaled about an axle of the pinion gear carrier. This design allows for a simple and effective construction easy to service compared with other carrier assemblies.

In a preferred aspect of the invention, each cable reel has on an outer surface a circumferential groove for accommodating respective cables. The design of the outer surface allows for steering the cables so that they remain in position on the cable reel and do not jam.

In an embodiment of the invention, the cable reel is rotatably journaled on the shaft using a ball bearing.

The ball bearing provides stability to the cable reels. The bearings are generally stainless steel bearings using non-contact metal seals. This type of seal keeps the grease in place while providing the least amount of friction.

In another implementation of the invention two or more ball bearings are used to journal each reel. The two or more ball bearings provide axial stability to the reels so that they will not wobble on the axle when a user pulls the cables.

While 2 pinion gears is sufficient for the reel differential to function, it is generally preferred that the shaft has three or four pinion gear carriers extending in a radial direction. The use of further pinion gears provide stability to the system avoiding the cable reels to wobble or flex relative to each other when a user pulls in only one of the cables.

Generally, it is desired that the circumferential groove extends over 2 or more revolutions of the outer surface of the reel. This design allows for the use of longer cables or shorter diameter of the cable reel. Long cables are useful when up-right exercises are performed.

In an embodiment of the invention an end of the shaft is provided with a first part of a coupling mechanism. The first part of the coupling mechanism allows for connecting to equipment having the other part of the coupling mechanism. Thus, the coupling mechanism allows for the connection of the cable reel system with the flywheel that comprises the second part of the coupling mechanism. In that way the user can experience the dual action of the torque resistance and the flywheel.

While the cable reel system is not sensitive to the type of bearings used, it is generally preferred that the ball bearings use non-contact metal seals. This type of seal keeps the grease in place while providing a low amount of friction.

In an embodiment of the invention an incremental encoder is used for each cable reel. This type of encoder is chosen since it allows a rather big airgap between the read head and the encoder ring. Additionally, it provides sufficient speed capability at high resolution.

An aspect of the invention relates to a torque resistance mechanism of a multifunctional exercise apparatus comprising an electrical torque motor/generator having a hollow shaft, a torsional spring accommodated co-axially in the hollow shaft, a part of a coupling mechanism having a first and a second part, and a selector having a first and a second position, wherein the selector enables a user to engage the part of the coupling mechanism in a first position with the electrical torque motor/generator and in a second position with the torsional spring.

When the power supply is working properly, the selector will normally be positioned in the first position for providing the user with the added features provided by the electrical torque motor/generator. However, in case the power supply is disconnected or the electrical circuit stops operating properly, the user has the option to position the selector in the second position for engaging the torsional spring. The second position of the selector may herein be referred to as "contingency mode" because the torsional spring has reduced lifetime. However, the contingency mode will provide time until a replacement is in place. Both cycling and rowing can be performed in "contingency mode", however, resistive exercise is limited.

In an embodiment of the invention, the electrical torque motor/generator comprises a stator attached to a first housing and a rotor capable of being engaged with a part of the coupling mechanism. The annular stator is usually provided in a corresponding essentially cylindrical first housing. The rotor is rotatably provided in the hollow space defined by the annular stator. The center part of the rotor is suitably provided with an engagement mechanism for engagement with the hub. In the embodiment illustrated, the hub on an outer circumferential surface is provided with numerous teeth or "dog teeth" that mate with matching openings machined or otherwise provided in the center of the rotor.

In a suitable embodiment, the part of the coupling mechanism comprises an axially movable hub having a first position for engagement with the electrical torque motor and a second position for engagement with the torsional spring. When the circumferential teeth of the hub are engaged with the corresponding openings in the rotor center the engagement is locked. However, when a user moves the selector it causes the hub to move in an axial direction and thereby disengage the connection between the hub and the electrical torque motor/generator. The hub may be provided with a first part of a second set of engagement mechanism for the second position. Thus, an end section of the hub may in the embodiment illustrated in the present application be provided with a recessed rosette having a shape complementary to a shape of the second part of the second set of engagement mechanism provided on an end of the torsional spring.

In an implementation of the present invention, the torsional spring is present in a second housing rotatably mounted in the first housing. The torsional spring may normally be in a relaxed state when the contingency mode is not applied. However, when it is desired to adjust the exercise apparatus to the contingency mode the torsional spring initially needs to be tensioned by rotating the second housing. When the torsional spring has been tensioned the user will be experiencing a load when the cable reel system is engaged and the cables are pulled during the concentric phase of the exercise. During the return phase of the exercise the cables will be returned to the cable reel system by the action of the torsional spring.

In an embodiment of the invention a first end of the torsional spring is attached to the second housing and a second end of the torsional spring is attached to a spring rotor connectable with the part of the coupling mechanism. Usually, the torsion spring is a spiral torsion spring, and in this case, the first end is generally the outer end of the torsional spring. The other end of the spiral torsion spring attached to the spring rotor will then be the end closest to the center. The spring rotor is usually provided with a co-axial dog teeth gear having a shape capable of mating with the recessed rosette of the hub. When the torque resistance mechanism is in the contingency mode, i.e. when the selector is placed in the second position, the user can perform exercises using the spiral torsion spring as return force during rowing, when the other part of the coupling mechanism appearing on the cable reel system is engaged with the part of the coupling mechanism appearing on the hub.

In an embodiment of the invention, the second housing is provided with handles for rotating the second housing, said handles being provided with a releasable lock for releasing the torsional spring. The handles provide a grip for the user when the torsion spring is tensioned. When the grip on the handles are loosened by the user the lock prevents the tension from being released, unless the lock actively is deactivated.

In a certain implementation of the invention, the electrical torque motor/generator is controlled by a servo drive. Controlling the motor/generator with a servo drive enables the motor/generator to function as a servo motor with a high degree of speed and positional control. Generally, the rotor of the electrical torque motor/generator is equipped with an encoder connected to the servo drive. The encoder will allow the system to maintain a fixed load regardless of pull speed and direction.

In an embodiment of the invention, the motor/generator is connected to a shunt circuit. The shunt circuitry protects the motor DC bus against the back electromotive force created when the motor/generator is moved during the concentric phase of exercises. The shunt circuit 101 may be associated with the power cable 102, as shown in FIG. 15. The shunt circuitry may be provided in the housing also enclosing the cable reel system for guiding the heat generated away from the motor/generator.

The invention also relates to a flywheel arrangement of a multifunctional exercise apparatus comprising a flywheel rotatably positioned in a housing, a braking band arranged around a portion of the perimeter of the flywheel, and a tension adjusting mechanism comprising a moveable arm capable of adjusting the tension of the braking band and an electrical motor for operating the moveable arm, wherein the tension adjusting mechanism further comprises a knob for manual manipulation of the moveable arm, and a selector for enabling a user in a first position to operate the moveable arm with the electrical motor and in a second position to operate the moveable arm with the knob.

Normally, the selector is in the first position to allow the electrical motor to operate the moveable tension arm. However, in case of power loss, failure of the electrical motor, or failure in the electronics controlling the regulation the electrical motor can no longer adjust the tension of the braking band. The present invention offers a contingency mode in case the electric regulation system can no longer be used for adjusting the workload. The contingency system works by pushing the selector into the second position, thereby allowing the manual manipulation of the knob to operate the moveable arm and thus the adjustment of the braking band.

In an embodiment of the invention, a midsection of the tension arm is turnably attached to the housing, an end section of the moveable tension arm is tensioning the braking band, and the other end section is caused to move by the rotation of a moveable arm shaft. The design of the tension arm allows for a longer travel distance and a higher pull force on the braking band. Furthermore, this design allows only one tension arm to be used while still having full manual knob capability.

In an implementation of the invention, the moveable arm shaft is rotated by an electrical stepper motor. A force sensor may measure how hard the stepper motor is pulling on the braking band whereas another force sensor measures the actual braking torque on the flywheel. The sensor data will be used by the stepper motor to adjust intensity level for e.g. cycling, rowing and rope pulling.

The revolutions of the stepper motor axle may be transferred to a movement of the tension arm by fixing one end of the tension arm on a sled and providing a nut on the sled. When a threaded axle of the stepper motor is engaged in the nut, the tension of the braking band may be adjusted by the action of the stepper motor.

In some embodiments of the invention the knob is mounted on the tension arm shaft. In a preferred embodiment, the manual knob is engaged with the tension arm shaft by sliding of a floating shaft. Suitably, the floating shaft is provided with gears at each end capable of meshing with a gear connected to the knob in one end and a gear positioned on the tension arm shaft in the other end of the floating shaft. The use of a floating shaft avoids that the knob is turned by the stepper motor when it is not desired. When the selector is in the second position, the manual knob engages via the floating shaft directly with the tension arm shaft. When the selector is in the second position the manual knob will be disengaged and will not be turned by the stepper motor.

In a preferred implementation of the invention, the floating shaft is operated by a manual knob slider. The slider is preferably positioned on the outside of the housing for easy manipulation by a user. The slider has attached an arm protruding into the housing ending in a fork capable of engaging with a recess on the floating shaft for moving the shaft in dependence of the position chosen.

In a preferred aspect, the two gears on the floating shaft are slightly unaligned relative to the gear connected to the knob and the gear positioned on the tension arm, so that one gear set meshes before the other. The slight misalignment eases meshing as it occurs in two steps.

In an embodiment of the invention, the flywheel comprises a planetary gearing. The planetary gearing achieves a desired inertia while keeping flywheel mass and size down. Preferably, all gears are stainless steel gears.

Preferably, the spokes of the flywheel are acting as a fan. The function of a fan may be obtained by making the spokes have a height of about the same as the rim of the flywheel. Furthermore, a fan-action may be obtained by angulation of the spokes. Preferably, the spokes that are angled to assist in dissipation of heat from the flywheel is now acting as a fan. The fan is preferably pulling cold air in from the electronics side and blowing it out through the front of the module.

In an embodiment of the invention, the perimeter of the flywheel is provided with teeth for allowing a speed sensor to measure the velocity. The sensor can be adjusted to emit a pulse every time a tooth passes the read head. The sensor data may be used for adapting the tension of the flywheel.

These and other aspects will be apparent from the embodiment(s) described below.

DETAILED DESCRIPTION

Figure 1:
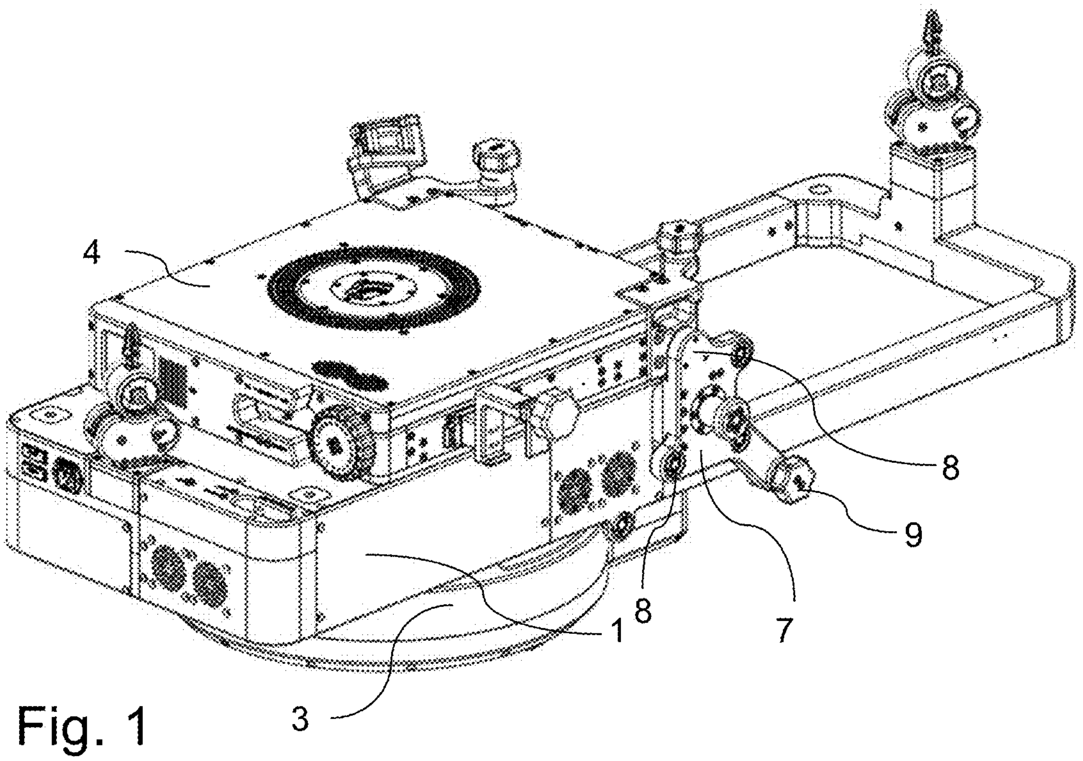
FIG. 1 discloses the multifunctional exercise apparatus in its first position, FIG. 2 discloses the first module in which the lid has been removed for showing the cable reel system.
Figure 2:
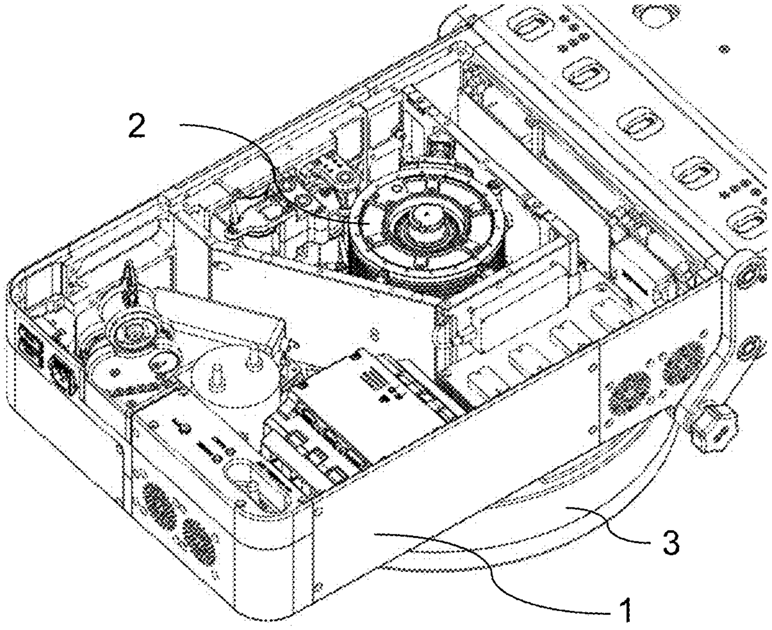

FIG. 1 discloses the multifunctional exercise apparatus in its first position, i.e. in a position which the force experienced by the user is obtained by the combined effect of the torque resistance mechanism and a flywheel. The first module 1 has an essentially box shape with rounded corners. FIG. 2 discloses the first module in which the lid has been removed for showing the cable reel system 2. The cable reel system is operably connected to the torque resistance mechanism 3 that provides resistance when a cable on the cable reel system is pulled and return the cable to the reel.

Figure 3:
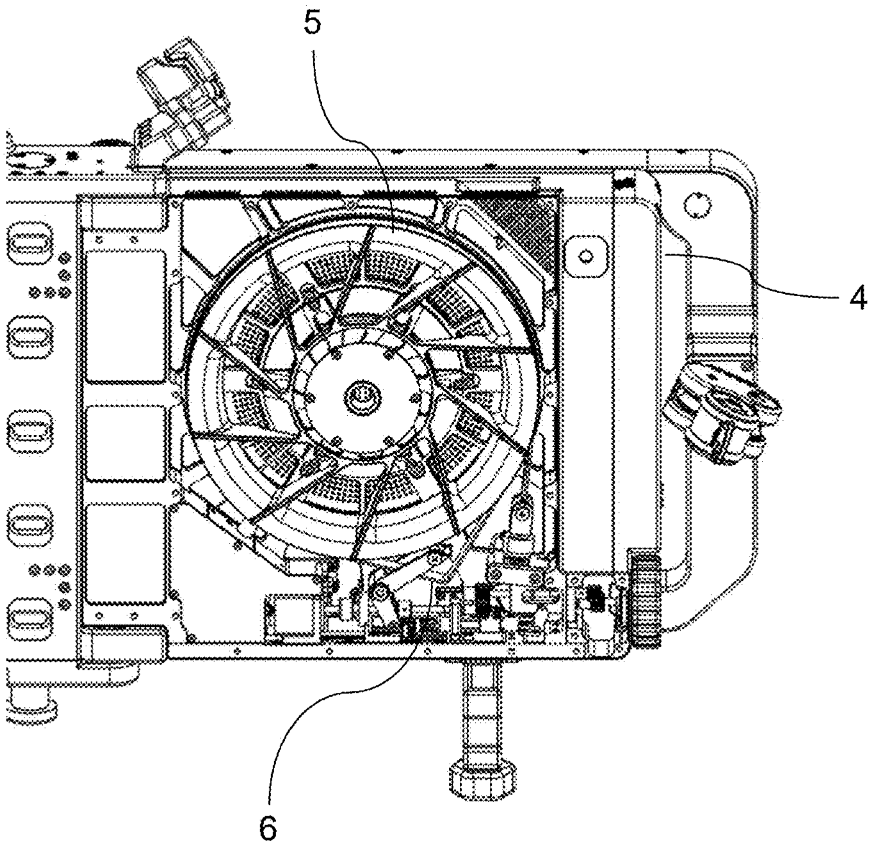
FIG. 3 shows the flywheel with the lid of the second module removed.

The multifunctional exercise apparatus furthermore comprises a second module 4. The second module has an essentially box shape with slightly rounded corners. In FIG. 3 the lid of the second module has been removed to show the flywheel 5 contained in the box shaped module. Around a part of the perimeter of the flywheel a braking band 6 is positioned for providing resistance to the inertia produced by the flywheel.

Figure 4:
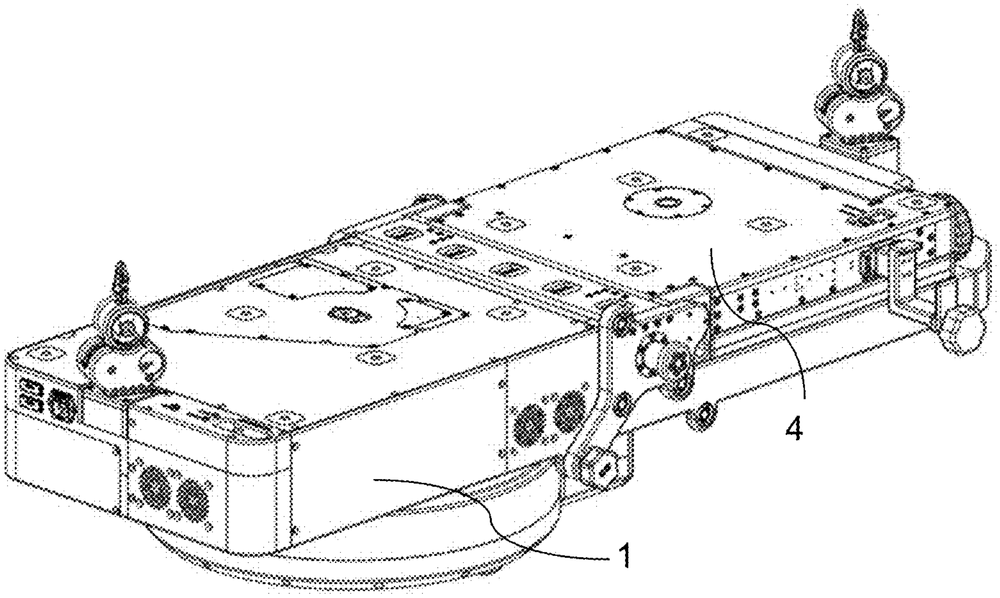
FIG. 4 shows a second position for the first and second module in which the torque resistance mechanism of the first module may be operated independently of the action of the flywheel, FIG. 5 discloses a third position of the first and second modules.

The first and the second module can be arranged in at least 2 different positions as shown in FIG. 1 and FIG. 4, respectively. FIG. 1 shows a first position in which the torque resistance mechanism 3 of the first module is operably connected to the flywheel 5 positioned in the second module, i.e. the second module is positioned on top of the first module. FIG. 4 shows a second position for the first and second module in which the torque resistance mechanism 3 of the first module can be operated independently of the action of the flywheel 5 when a user pulls a cable of the cable reel system 2.

The connection of the torque resistance mechanism 3 with the flywheel 5 may be performed by providing the torque resistance mechanism with a first part of a coupling mechanism such as a hub and the flywheel with a second part of the coupling mechanism, such as a hub, whereby the hubs are positioned coaxially when the modules are in the first position for enabling an operable connection when an axle is provided in the hubs.

The first module 1 and the second module 4 are connected along an edge of each of the modules by a hinge 7. The hinge allows the first and the second module to be moved relative to each other so as to obtain the first and second position. The hinge 7 is a double hinge allowing a major surface of the first module to flush with a major surface of the second module, thereby providing a platform for the user. The double hinge includes 2 pivot joints 8 for pivoting the second module to different positions relative to the first module. A handle 9 is provided for assisting the user in positioning the second module in the desired position. The hinge 8 may be locked in a certain position to maintain the desired position of the modules during an exercise.

Figure 5:
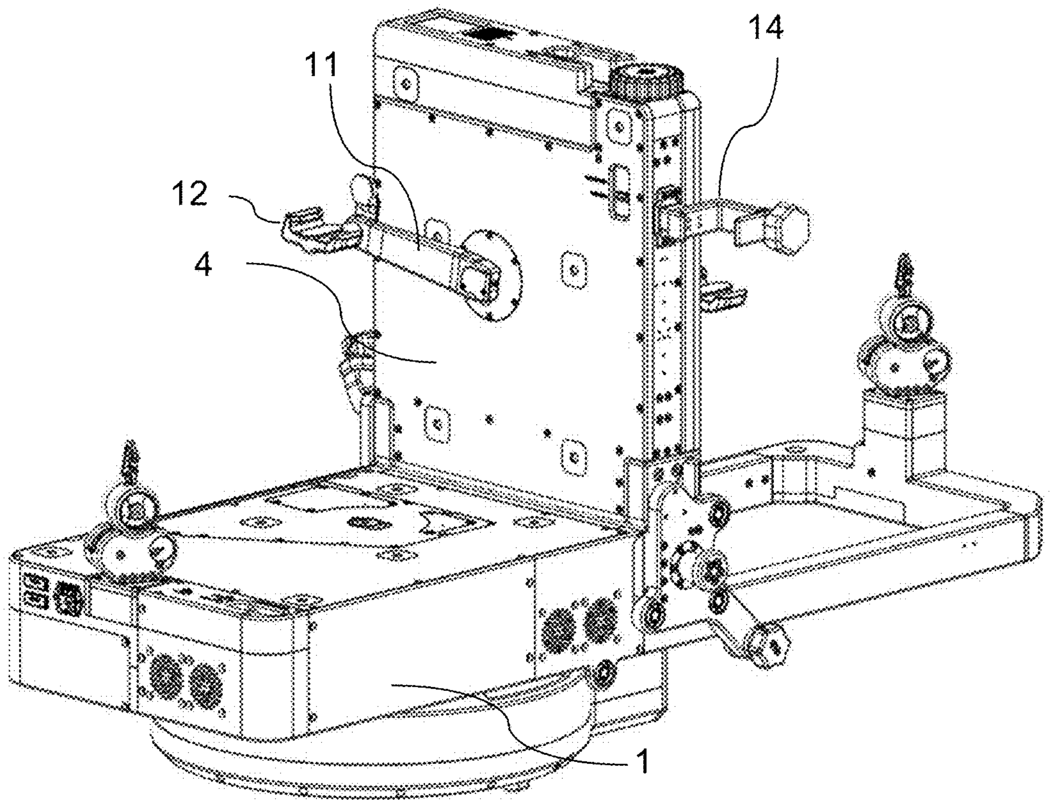
Figure 6:
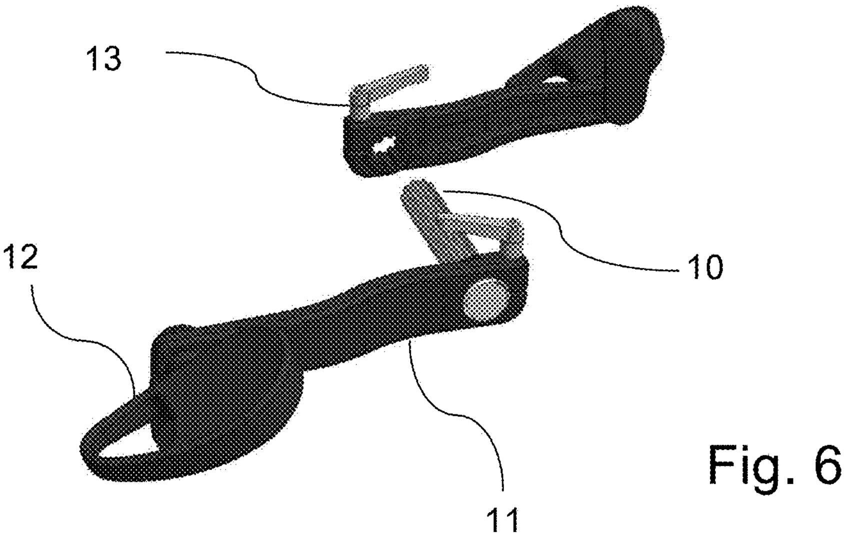
FIG. 6 shows an axle fitted with pedal arms and pedals at each end.

FIG. 5 discloses a third position of the first and second modules relative to each other. In the $3^{rd}$ position a main extent of the first module, i.e. the surface pointing upwards on FIG. 5, is perpendicular to a main extent of the second module. The hub of the second module is provided with a through-going splined axle 10 fitted with pedal arms 11 and pedals 12 at each end in the third position. The pedal arms are provided with the snap lock 13 for fast and efficient mounting and dismounting of the equipment necessary for performing a cycling exercise.

Figure 7:
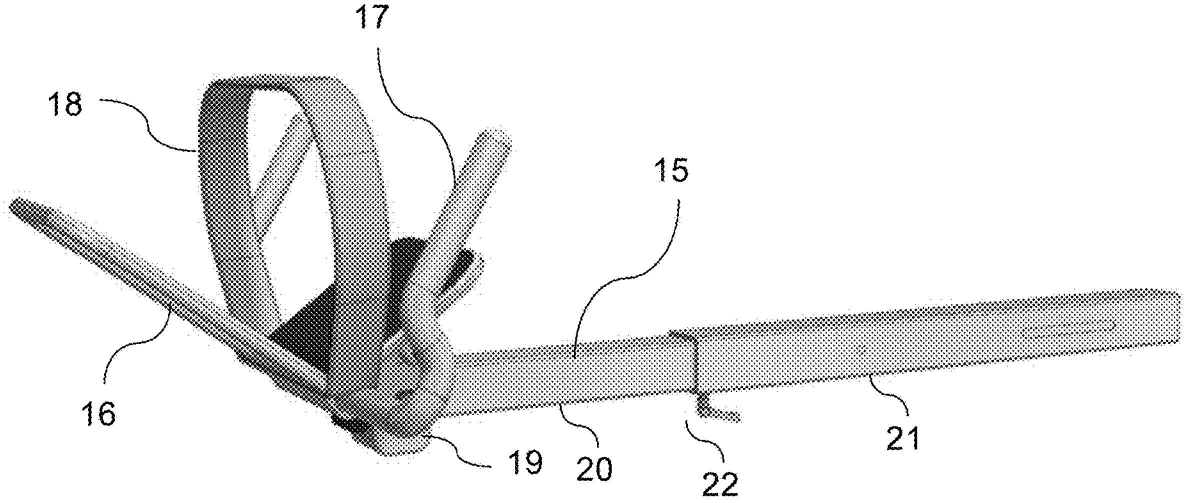
FIG. 7 shows the biking seat for use in the cycling mode.

The second module is provided with engaging means 14 for accommodating a seat post 15. Optionally a second engaging means may be positioned on the hinge for allowing the seat post to be attached to two positions in order to obtain higher stability. The seat is provided with a back support 16, which angle can be adjusted. Additionally, the back support may have 5-10 degrees of spring-loaded flex that can be enabled and disabled. For biking the seat will be configured as shown in FIG. 7. The back support will be used in combination with the handles 17 to achieve a posture similar to a recumbent exercise ergometer. The back support may be locked or allowed to flex depending on user preference. The seat post comprises a waist strap 18 to keep the user down on the seat during exercise at micro gravity. For biking this waist strap can be used either in combination or instead of the handles. The inertia of the flywheel makes it possible to adjust the workload in a way that feels similar to bicycling on ground. In a preferred embodiment, the flywheel continues to spin while pedals stay stationary when the subject stops pedaling. This is possible due to the one-way bearing connecting the flywheel to the axle.

For rowing in the first position of the modules, the back support will generally be positioned in a more up-right position. The spring-loaded flex of the back support will provide the user with tactile feedback that they should not extend further when they feel the seat without hitting a "rigid wall". In rowing the waist strap is a necessity since the force from the rope will generate a rotation away from the seat.

The seat is mounted on a carriage 19 that can slide on the inner tube 20 of the seat post to allow the user to perform the rowing exercise. The sliding function can be locked in the top position when the apparatus is used for the cycling exercise. The inner tube can be adjusted freely in the outer tube 21 and locked in any position with the snap lock 22 on the outer tube.

Figure 8:
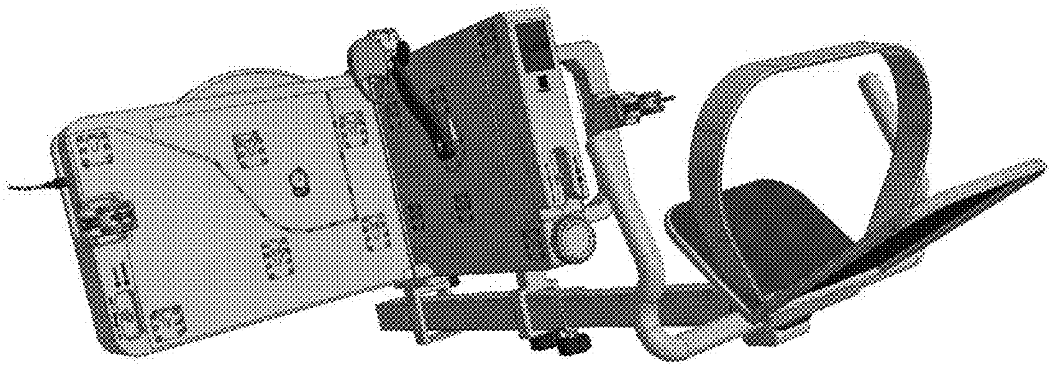
FIG. 8 shows the multifunctional exercise apparatus configured in the cycling mode.

FIG. 8 show the multifunctional exercise apparatus configured in the cycling mode. The user initially is positioned in the seat by securing the strap 18 around the waist. Subsequently the cycling shoes (not shown) having clamps corresponding to the pedal locking system are clicked in the pedals.

Figure 9:
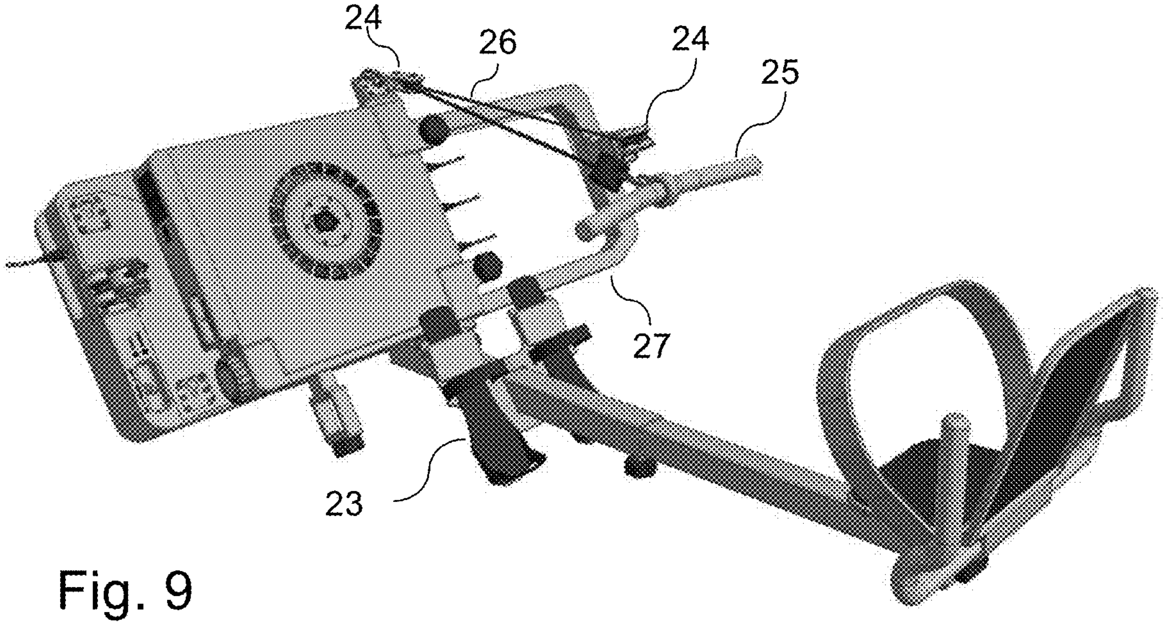
FIG. 9 shows the multifunctional exercise apparatus configured in the rowing mode.

FIG. 9 shows the multifunctional exercise apparatus configured in the rowing mode. For rowing, separate footplates 23 are installed. These footplates are needed for foot fixation and to achieve a suitable geometry, where the feet are below the seat and rope exit point. The footplates also angle the feet correctly and they allow the user to bend his/her toes without falling out of the feet fixation. The frame 27 extending from the first module and serving as support for the second module in other configurations is provided with a swivel 24. Similarly, the platform is provided with a swivel 24. The cable attached to the rowing handle 25 in one end is guided by the swivels to the cable reel system operably connected to a torque resistance mechanism. When the user pulls in the rowing handle the person will experience the combined forces exerted by the torque resistance mechanism and the flywheel with brake.

Figure 10:
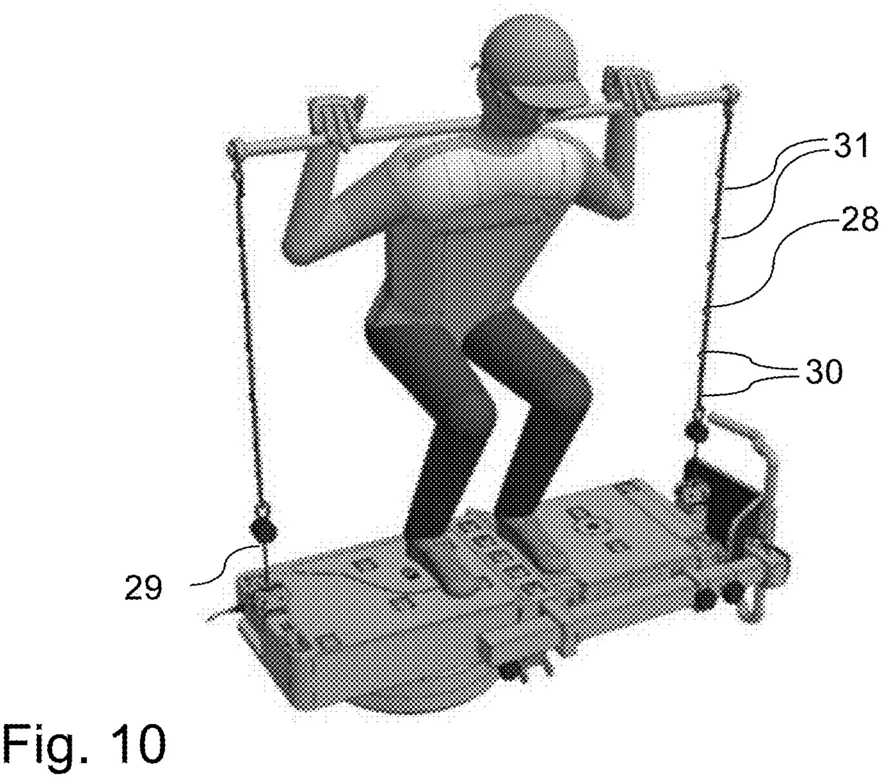
FIG. 10 shows the multifunctional exercise apparatus configured in the “dual rope mode”, FIG. 11 discloses the rope pulling unit connected to the multifunctional exercise apparatus.

When performing resistive exercises, the user can choose to use both ropes exiting from the sides of the platform formed by the first and second module arranged in the second position. This will typically be done with the wide handle used for heavy exercises such as squat, bench press and deadlift. It can also be used for bicep curls and other lighter exercises if desired. The "dual rope mode" is illustrated in FIG. 10 with the squat exercise as an example. The swivels are positioned in each end of the platform formed by the upper surface of the first module in flush with the upper surface of the second module. The cable from the cable reel system is guided by the swivels to the specific add-on selected by the user. In FIG. 10, the user has selected a wide bar connected to slack lines 28 in each end. The slack lines are safer when the wide handle is used for "under bar" exercises. The slackline is a piece of rope installed between the handle and a mechanical end stop 29 on the ropes. This extra rope can never be pulled into the machine and acts as a safety feature for the user. It works by ensuring that the user cannot be forced into a dangerous position between the bar and the platform, i.e. when a squat is performed the slackline stops the machine from pulling the bar lower than the lowest position of the squat. The slack lines also make it easier to achieve a better position for initiating certain exercises. The slack line has a number rubber sleeves 30 around it to stiffen the rope slightly with alternating loops 31 between the rubber sleeves for allowing the end of the bar to engage with the slack line. During the squat exercise the forces exerted by the torque resistance mechanism are experienced by the user and not the flywheel.

The swivel allows the cable to be pulled in any direction within a semi sphere with its origin in the swivels. The flexibility makes it possible to use a wide range of add-ons, including a single hand handle for exercises using a single rope, such as triceps extensions, twisting exercises or other asymmetrical exercises. To use one rope, the other rope is simply left untouched at its end stop. A single hand handle is then attached to the other rope end stop. A slack line is generally not needed since the user cannot be caught under the handle.

Instead of using the main exit points the pulleys can also be attached to one of the attachment points on the exercise unit. The handle can then be connected to the rope end stop like usual. This way the rope is now in "Single Rope" mode but coming from a different position on the platform.

Figure 11:
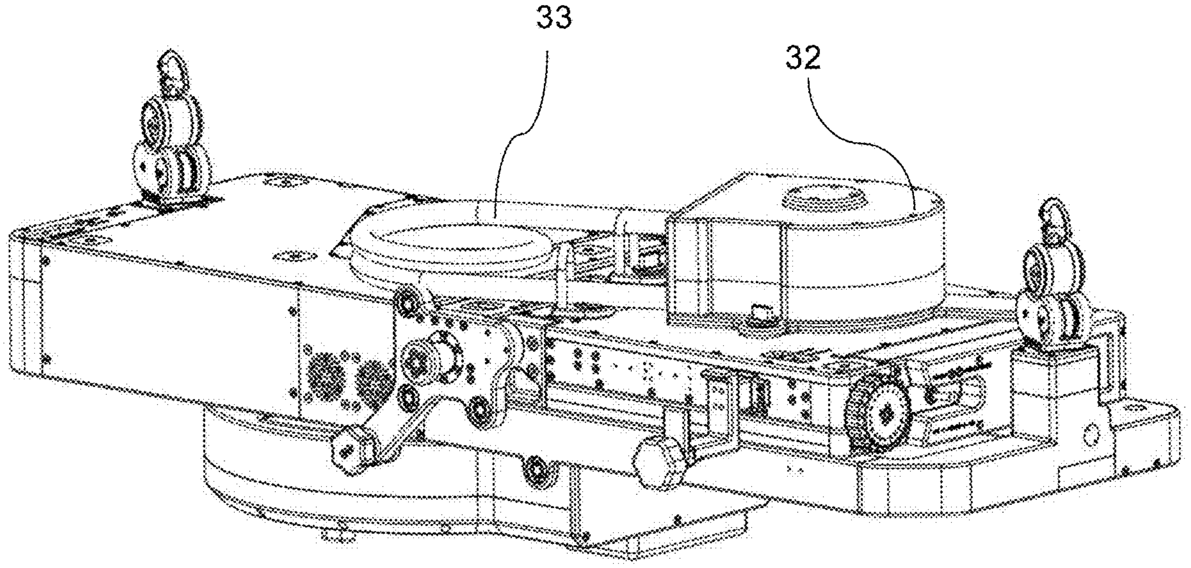
Figure 12:
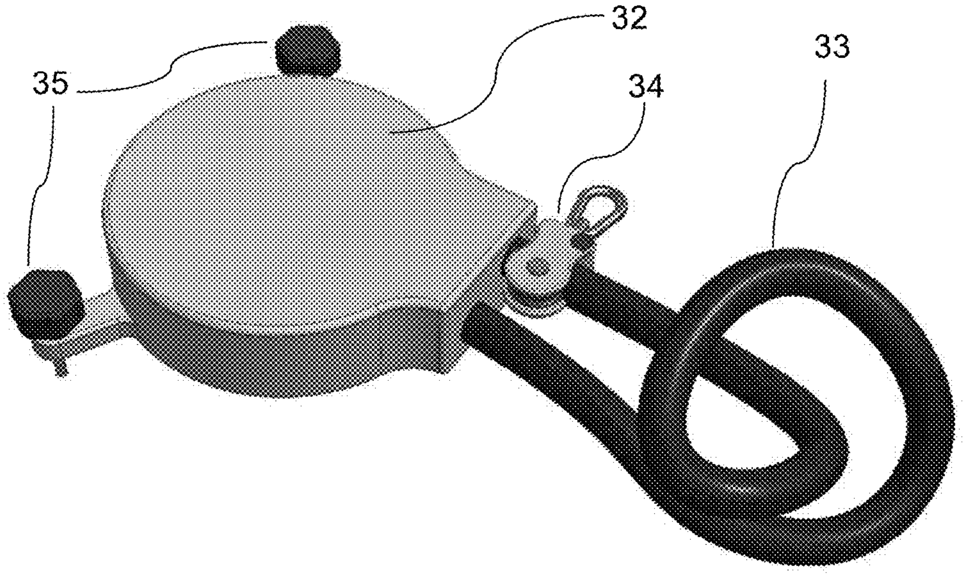
FIG. 12 shows the rope pulling unit containing an endless rope.

FIGS. 11 and 12 show a rope pulling unit 32 for connection with the flywheel in the second module. The rope pulling unit contains an endless rope 33. This rope is driving an axle mounted in the hub of the second module. Thus, the rope will pull the flywheel into motion with the possibility to do hand over hand pulling. The rope pulling will preferably have a pulley 34 mounted fixed on the rope as it will be needed for fixing a section of the endless rope to the platform. Furthermore, the pulley is adapted for the thicker rope usually used for rope pulling. The rope unit is releasably attached to the second module by turning the bolts 35. The head of the bolts has a size and form easy for the human hand to manipulate.

Resistance of the endless rope is adjusted by the braking band. As opposed to the finite rope stroke in rowing the rope in the rope pulling add-on is endless (a closed loop) and can be pulled an "infinite" amount. The rope is guided to the center attachment point by the pulley 34.

Figure 13:
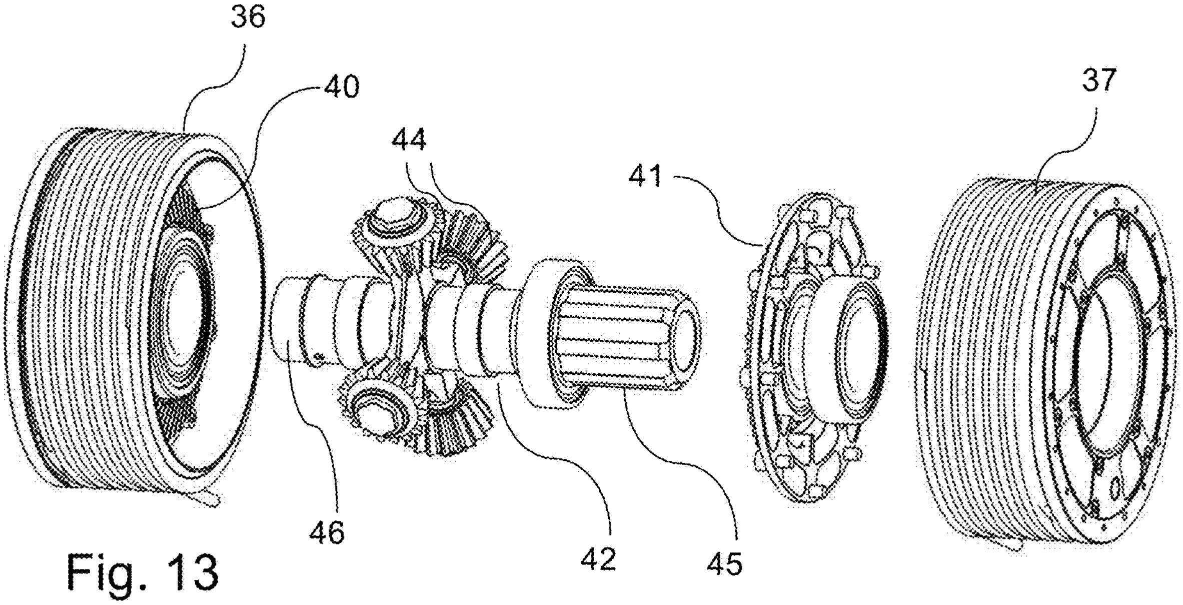
FIG. 13 shows the cable reel system in an exploded view, FIG. 14 discloses the cable reel system in a cross-sectional view.
Figure 14:
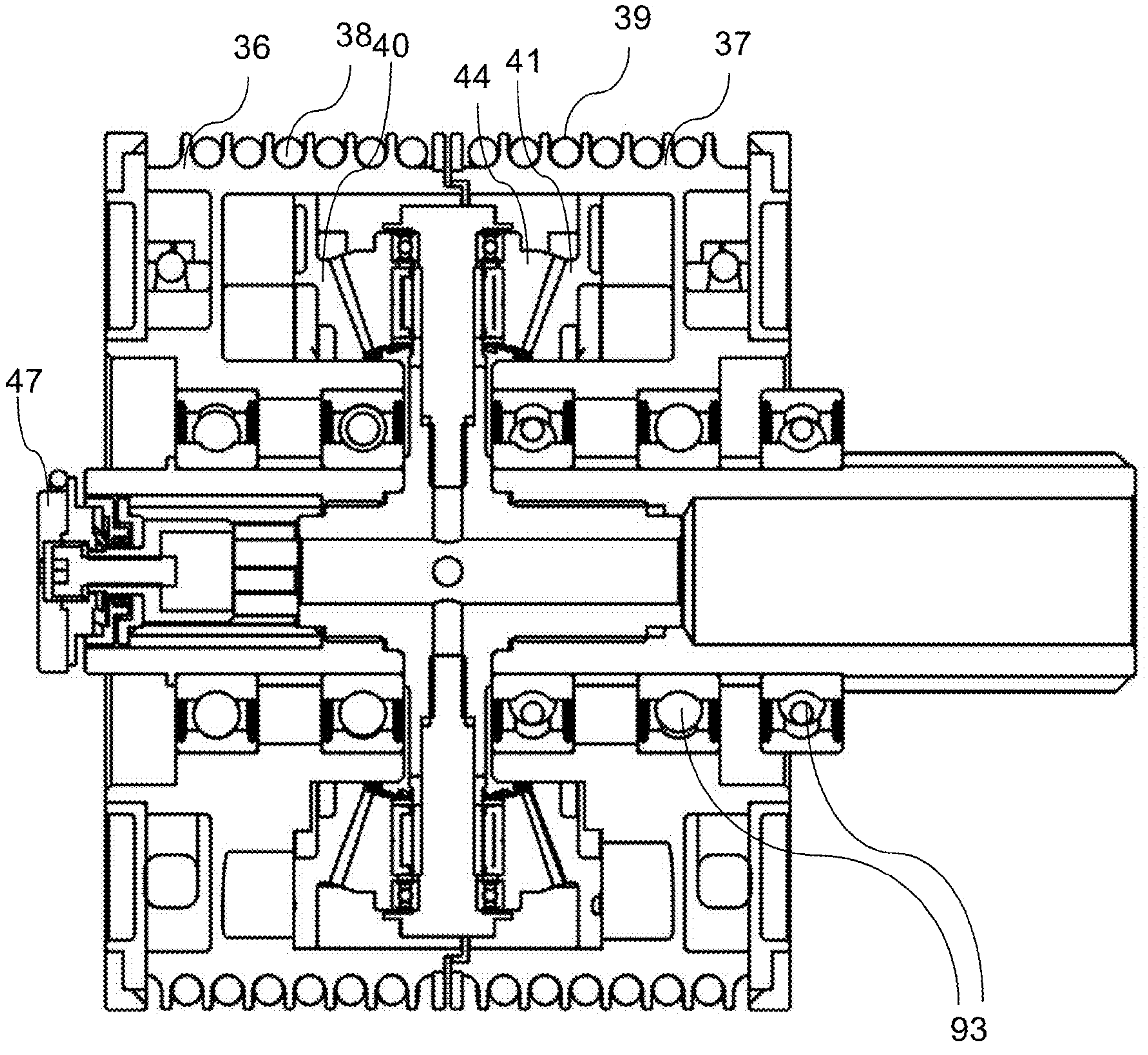

FIGS. 13 and 14 show the cable reel system. An upper cable reel 36 facing the second module and a lower cable reel 37 facing the torque resistance mechanism are provided on the outer circumference with grooves 38 for accommodating a cable 39. On a side of the upper cable reel facing the lower cable reel a ring gear 40 is provided and on a side of the lower cable reel facing the upper cable reel another ring gear 41 is provided. The upper and lower cable reels are rotatably journaled on the shaft 42. Between the upper and the lower cable reel the shaft is provided with 4 carriers extending in the radial direction. In the upper end of the carriers, pinion gears 44 are rotatably journaled and mesh with both of the two ring gears. While the 4 pinion gears rotate freely around their axis, they follow the rotation of the shaft. Thus, if the shaft is stationary and one reel is rotated clockwise, then the other reel will rotate counter-clockwise. If one reel is stationary the other will follow the rotation of the shaft and hub. The moving reel will move twice as fast as the shaft and hub though. If both reels are moved at the same speed, then the shaft and hub will follow their rotation 1:1. As a result of this mechanism the torque on the shaft will always be divided equally between each reel.

The upper and lower cable reels are journaled on the shaft using ball bearings 93. The ball bearings are of stainless steel using non-contact metal seals. This type of seal keeps the grease in place while providing the least amount of friction.

In the end of the shaft designed for engagement with the torque resistance mechanism 3 a splined part 45 is provided. In the other end of the shaft a hub 46 is provided for engagement with a corresponding axle. When the hub is not engaged with an axle it may be provided with a cap 47.

Figure 15:
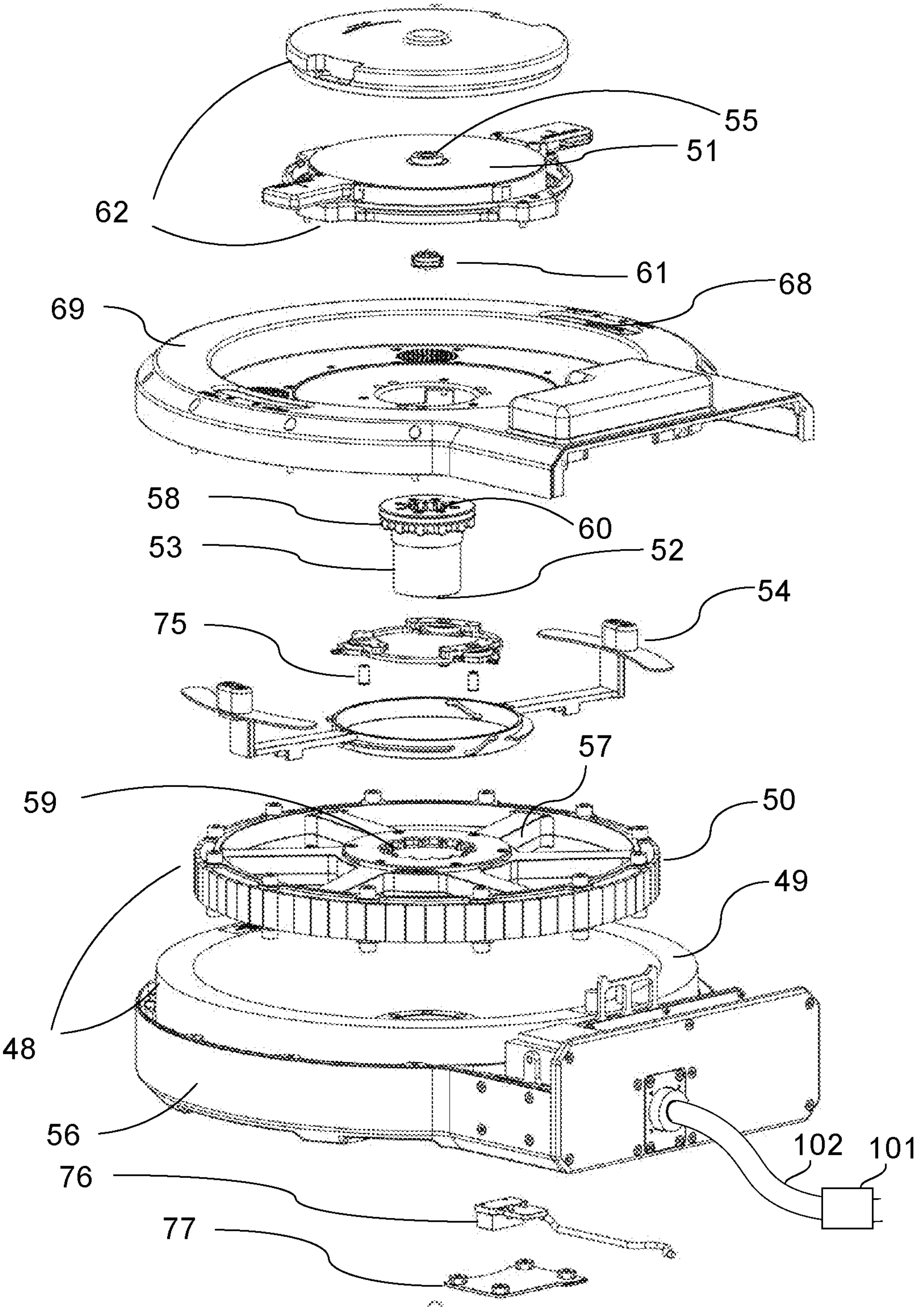
FIG. 15 shows an exploded view of the torque resistance mechanism.
Figure 16:
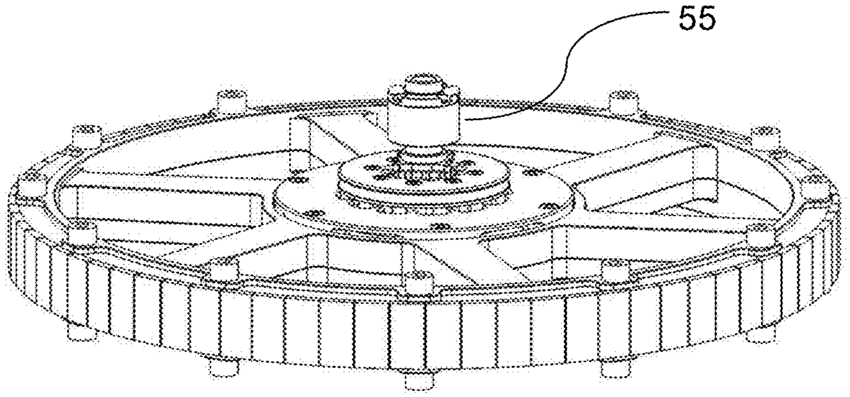
FIG. 16 shows the coupling mechanism being engaged with the rotor of the electrical torque motor/generator.
Figure 17:
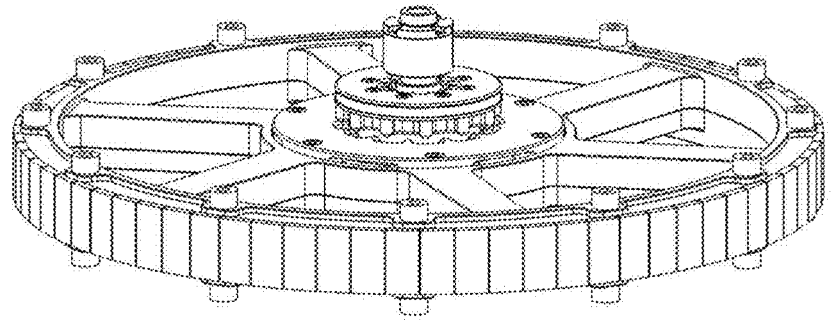
FIG. 17 shows the coupling mechanism being engaged with the rotor of the torsion spring, FIG. 18 discloses the lid and the spring rotor in exploded view.

FIG. 15 shows an exploded view of the torque resistance mechanism. The electrical torque resistance mechanism comprises an electrical torque motor/generator 48 comprising a stator 49 and a rotor 50. In the hollow shaft defined by the stator a torsional spring 51 is co-axially accommodated. The electrical torque resistance mechanism also comprises a part of a coupling mechanism, which may be selected as a hub 53 having a cavity 52 capable of mating with another part of a coupling mechanism, such as the shaft of the cable reel system. Generally, the shaft is splined, and the hub contains complementing grooves for accommodating the shaft. The electrical torque resistance mechanism also comprises a selector 54 capable of being moved to at least two positions. In a first position, illustrated on FIG. 16 the coupling mechanism is engaged with the rotor 50 of the electrical torque motor/generator and in a second position illustrated on FIG. 17, the coupling mechanism is engaged with the rotor 55 of the torsion spring.

The stator 49 is attached to a lower part of an enclosure 56 and the rotor 50 is rotatably arranged in the hollow space defined by the essentially annular stator. The rotor 50 is provided with spokes 57 for connecting the rim with the center. The center of the rotor 50 is provided with a recess capable of being engaged with a part of the coupling mechanism, such as a hub 53 provided in an outer circumference with a plurality of teeth or "dog teeth" that mate with matching openings machined or otherwise provided in the center of the rotor.

The coupling mechanism used to illustrate the present invention is a hub capable of being moved in axial direction between a first position for engagement with the electrical torque resistance mechanism 48 and a second position for engagement with the torsional spring 51. When the circumferential teeth 58 of the hub 53 are engaged with the corresponding openings in the rotor center 59 the engagement is locked. However, when a user moves the selector 54 it causes the hub to move in an axial direction and thereby disengages the connection between the hub and the electrical torque motor/generator. An upper section of the hub is provided with a recessed rosette having a shape complementary to the shape of the dog teeth 61 connected to the rotor 55 of the torsion spring 51.

Figure 18:
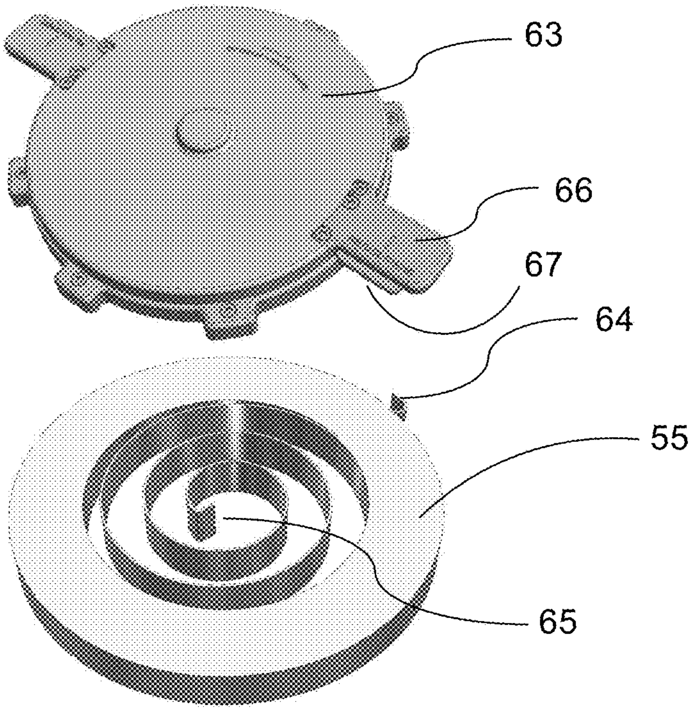
Figure 19:
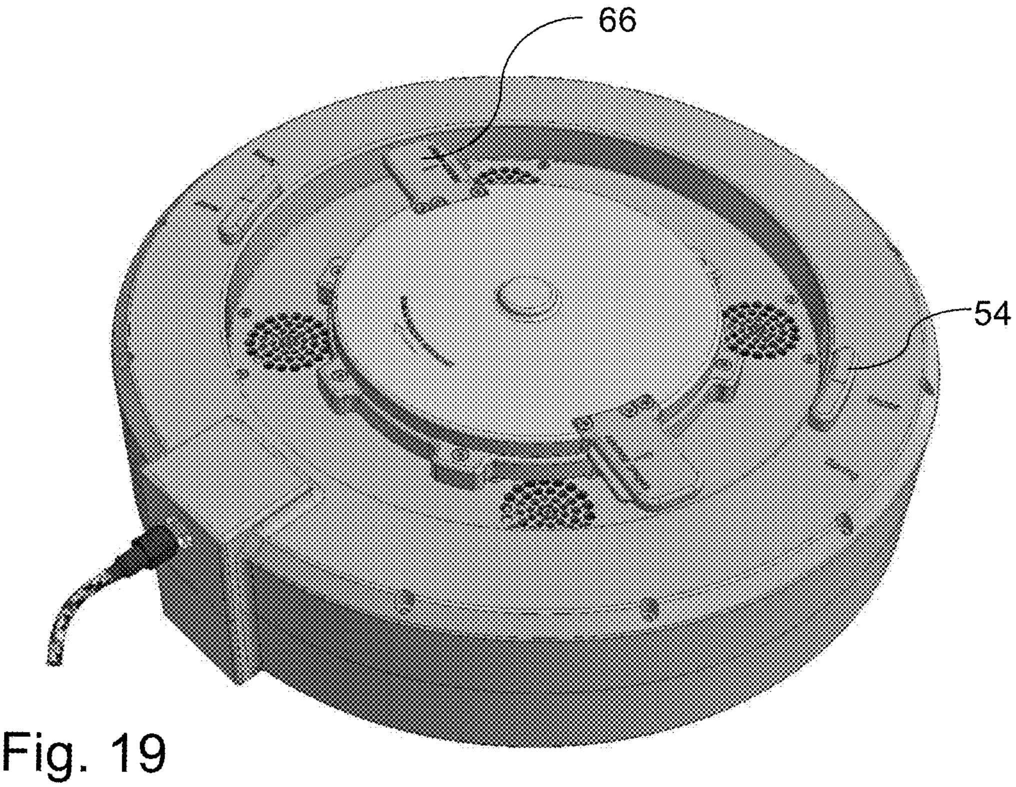
FIG. 19 shows the spring housing mounted rotatably in the housing of the electric torque resistance mechanism, FIG. 20 discloses the second position in which the hub is lifted.

The spring 51 is positioned in a separate spring housing 62 mounted rotatably in the housing of the electric torque resistance mechanism. FIG. 18 shows the lid 63 of the spring housing 62 comprising a not shown pole protruding from the back side of the lid for engagement with the hook 64. The other end of the spiral torsion spring 65 is engaged with the spring rotor 55. Thus, when the dog teeth gear 61 provided on the spring rotor is engaged with the rosette 60 of the hub 53 the user can perform exercises using the spiral torsion spring as load.

Before the user can use the torsion spring as load it needs to be tensioned. The tensioning is performed by rotating the spring housing. To help the user twisting the spring housing, it is provided with handles 66 attached to the lid 63. The handles are provided with a lock for preventing the spring housing from spinning back to a relaxed position. After usage, the tensioning of the spiral torsion spring may be relaxed by deactivating the lock.

Figure 20:
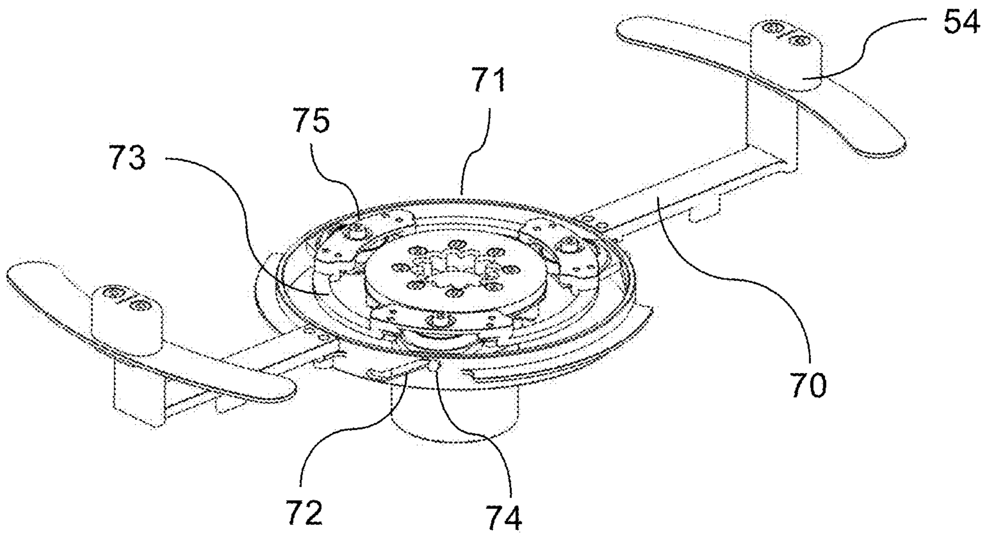
Figure 21:
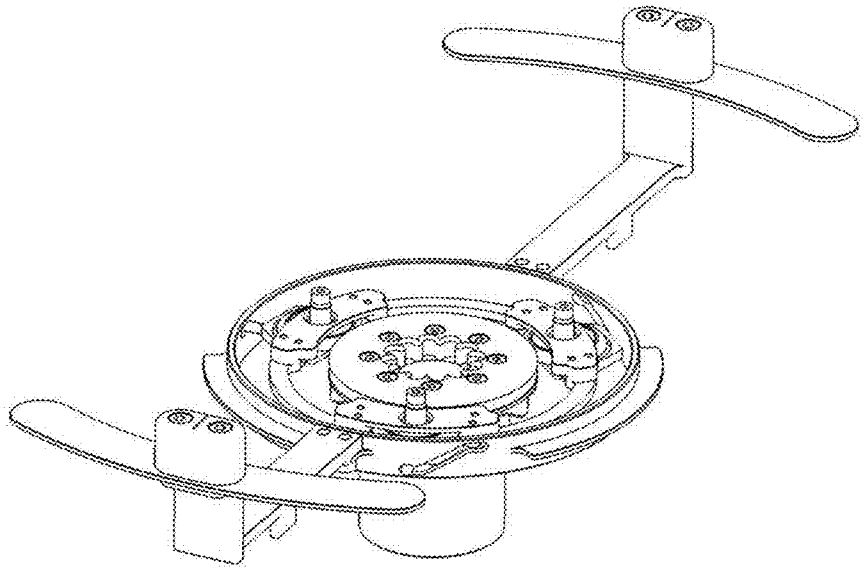
FIG. 21 shows the first position in which the hub is lowered.

The toggle mechanism for moving the hub in axial direction between the two positions is shown in detail in FIG. 20 and FIG. 21. The selectors 54 protrude through the openings 68 in the lid 69 of the first housing comprising the electric torque system. The selector may be moved between a first position termed "motor" and a second position termed "spring" by the user. When the selector is moved, arms 70 turn the shift collar 71 provided with traces 72. An axially moveable ring 73 is provided with radially extending pins 74 positioned in the traces 72. As the shift ring columns 75 are fixed on the lid 69 the ring 73 will move axially when the selector is moved between the positions. FIG. 20 shows the second position in which the hub is lifted and the rosette 60 will mesh with the dog teeth 61 provided on the spring rotor. FIG. 21 shows the first position in which the hub is lowered and the circumferential dog teeth 58 are caused to mesh with the opening 59 of the rotor of the electrical torque motor/generator.

The rotor for the electrical torque motor/generator is provided with an optical read head for an encoder 76. For increased serviceability of the encoder a lid 77 is provided. The encoder may be selected as Renishaw RESOLUTE™ absolute encoder with the RESA30 rotary ring provided on the rotor.

The hub may be provided with a first part of a second set of engagement mechanism for the second position.

Figure 22:
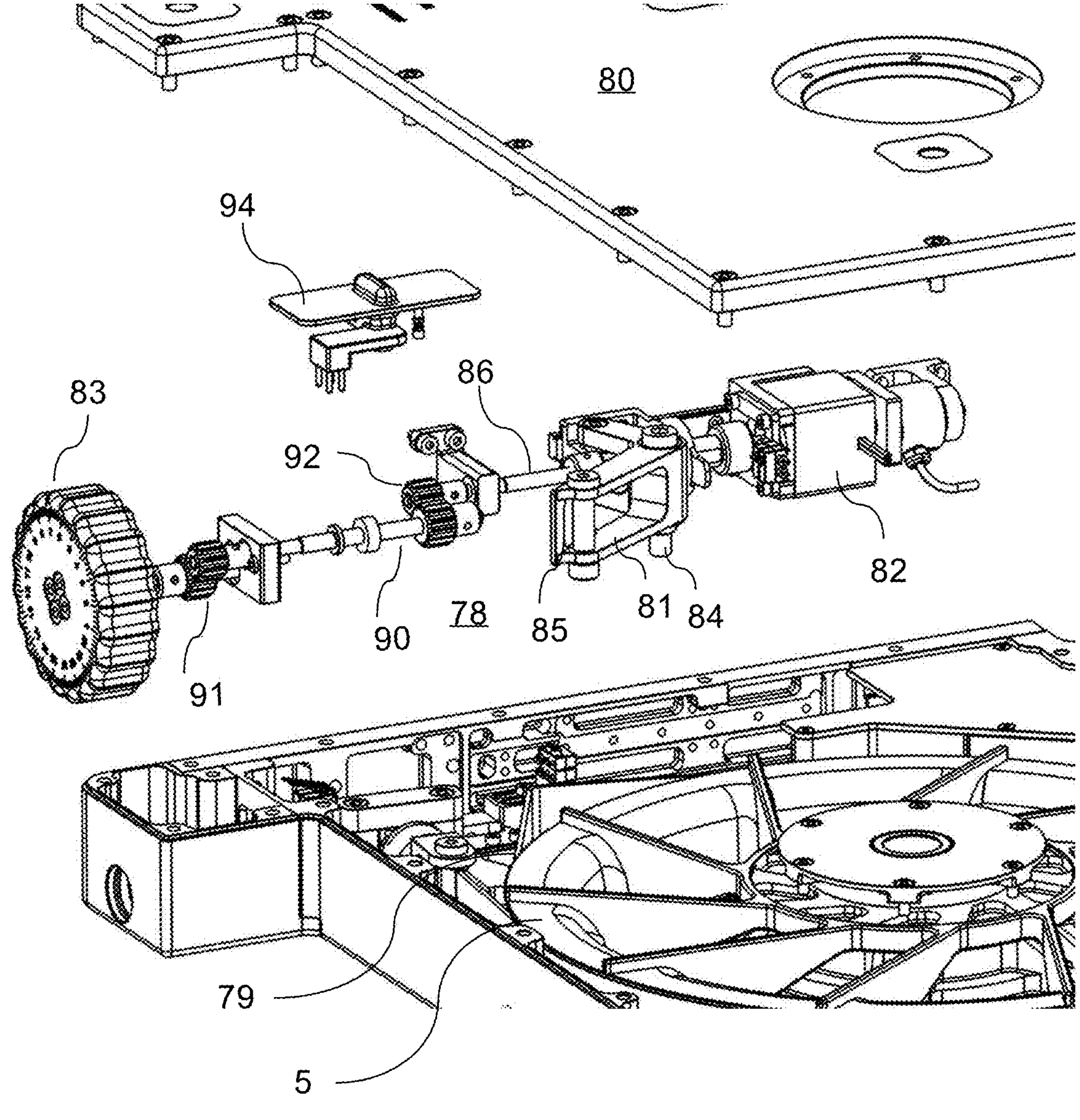
FIG. 22 shows a part of the second module in an exploded view, FIG. 23 discloses the tension adjusting mechanism in the first position.

FIG. 22 shows a part of the second module in an exploded view. The explode view extracts the tension adjustment mechanism 78 from the second module and the manual knob slider 94 from the lid 80 of the second module. The flywheel 4 is rotatably provided in the second module. The braking band 79 is arranged around a portion of the perimeter of the flywheel. The tension adjustment mechanism comprises a moveable arm 81 capable of adjusting the tension of the braking band and an electrical motor 82 for operating the moveable arm. The tension adjusting mechanism comprises a knob 83 for manual manipulation of the tension arm. The tension adjusting mechanism also comprises a selector 94 for enabling a user in a first position to operate the moveable tension arm with the electrical motor and in a second position to operate the moveable arm with the knob.

The tension arm 81 is bended and in a midsection 84 attached to the housing. The end of the tension arm pointing towards the flywheel is provided with a slot 85 for guiding and tensioning the braking band. The slot may be provided with a roller to reduce the resistance between the slot and braking band. The other end section of the tension arm is caused to move by the rotation of a tension arm shaft 86. The tension arm shaft is rotated by the stepper motor 82. The revolutions of the stepper motor axle 87 may be transferred to a movement of the tension arm by fixing one end of the tension arm on a sled 88 and providing a nut 89 on the sled. When a threaded axle 87 of the stepper motor is engaged in the nut, the tension of the braking band may be adjusted by the action of the stepper motor 82.

Figure 23:
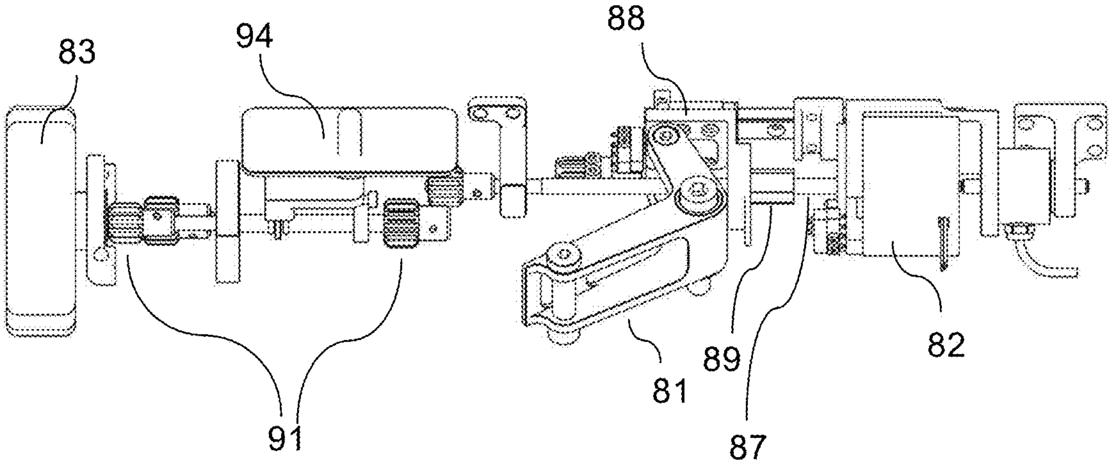

The manual knob 83 is provided with an axle having a gear 91 in the opposing end. The gear 91 may be engaged with the tension arm by sliding the floating shaft 90 provided with gears at each end 91. FIG. 23 shows the tension adjusting mechanism in the first position, i.e. where the manual manipulation is disengaged and FIG. 22 shows the tension adjusting mechanism in the second position where the knob is engaged and has full control of the tension arm regardless of the position of the stepper motor 82. The two gears 91 on the floating shaft are slightly unaligned relative to the gear connected to the knob 91 and the gear positioned on the tension arm 92, so that one gear set meshes before the other.

In this embodiment, structures and features that are the same or similar to corresponding structures and features previously described or shown herein are denoted by the same reference numeral as previously used for simplicity.

The various aspects and implementations have been described in conjunction with various embodiments herein.

However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

I claim:

1. A torque resistance mechanism of a multifunctional exercise apparatus comprising:
  an electrical torque motor/generator having a hollow shaft;
  a torsional spring accommodated co-axially in the hollow shaft; and
  a coupling mechanism having a first part and a second part, said coupling mechanism movable between a first engagement position in which said first part engages the electrical torque motor/generator and a second engagement position in which said second part engages the torsional spring; and
  a selector movable between a first selector position and a second selector position; wherein
  when the selector is moved to the first selector position the first part of the coupling mechanism engages the electrical torque motor/generator and when the selector is moved to the second selector position the second part of the coupling mechanism engages the torsional spring; and wherein
  the electrical torque motor/generator comprises a stator attached to a first housing and a rotor capable of being engaged with the coupling mechanism.

2. The torque resistance mechanism according to claim 1, wherein the torsional spring is present in a second housing rotatably mounted in the first housing.

3. The torque resistance mechanism according to claim 2, wherein the second housing is provided with handles for rotating the second housing, said handles being provided with a releasable lock for releasing the torsional spring.

4. The torque resistance mechanism according to claim 1, wherein the electrical torque motor/generator is controlled by a servo drive.

5. The torque resistance mechanism according to claim 1, wherein the rotor of the electrical torque motor/generator is equipped with an encoder connected to a servo drive.

6. A torque resistance mechanism of a multifunctional exercise apparatus comprising:
  an electrical torque motor/generator having a hollow shaft;
  a torsional spring accommodated co-axially in the hollow shaft; and
  a coupling mechanism having a first part and a second part, said coupling mechanism movable between a first engagement position in which said first part engages the electrical torque motor/generator and a second engagement position in which said second part engages the torsional spring; and
  a selector movable between a first selector position and a second selector position; wherein
  when the selector is moved to the first selector position the first part of the coupling mechanism engages the electrical torque motor/generator and when the selector is moved to the second selector position the second part of the coupling mechanism engages the torsional spring; and wherein
  the electrical torque motor/generator comprises a stator attached to a first housing and a rotor capable of being engaged with the coupling mechanism; and wherein
  the coupling mechanism comprises an axially movable hub.

7. A torque resistance mechanism of a multifunctional exercise apparatus comprising:
  an electrical torque motor/generator having a hollow shaft;
  a torsional spring accommodated co-axially in the hollow shaft; and
  a coupling mechanism having a first part and a second part, said coupling mechanism movable between a first engagement position in which said first part engages the electrical torque motor/generator and a second engagement position in which said second part engages the torsional spring; and
  a selector movable between a first selector position and a second selector position; wherein
  when the selector is moved to the first selector position the first part of the coupling mechanism engages the electrical torque motor/generator and when the selector is moved to the second selector position the second part of the coupling mechanism engages the torsional spring; and wherein
  the electrical torque motor/generator comprises a stator attached to a first housing and a rotor capable of being engaged with the coupling mechanism; and wherein
  a first end of the torsional spring is attached to a second housing and a second end of the torsional spring is attached to a spring rotor connectable with of the coupling mechanism.

8. A torque resistance mechanism of a multifunctional exercise apparatus comprising:
  an electrical torque motor/generator having a hollow shaft;
  a torsional spring accommodated co-axially in the hollow shaft; and
  a coupling mechanism having a first part and a second part, said coupling mechanism movable between a first engagement position in which said first part engages the electrical torque motor/generator and a second engagement position in which said second part engages the torsional spring; and
  a selector movable between a first selector position and a second selector position; wherein
  when the selector is moved to the first selector position the first part of the coupling mechanism engages the electrical torque motor/generator and when the selector is moved to the second selector position the second part of the coupling mechanism engages the torsional spring; and wherein
  the electrical torque motor/generator comprises a stator attached to a first housing and a rotor capable of being engaged with the coupling mechanism; and wherein
  the electrical torque motor/generator is connected to a shunt circuitry.

9. A torque resistance mechanism of a multifunctional exercise apparatus comprising:
  an electrical torque motor/generator having a hollow shaft;
  a torsional spring accommodated co-axially in the hollow shaft; and a coupling mechanism having a first part and a second part, said coupling mechanism movable between a first engagement position in which said first part engages the electrical torque motor/generator and a second engagement position in which said second part engages the torsional spring; and a selector movable between a first selector position and a second selector position; wherein when the selector is moved to the first selector position the first part of the coupling mechanism engages the electrical torque motor/generator and when the selector is moved to the second selector position the second part of the coupling mechanism engages the torsional spring; and wherein the electrical torque motor/generator comprises a stator attached to a first housing and a rotor capable of being engaged with the coupling mechanism; and wherein the selector when moved between the first selector position and the second selector position causes the coupling mechanism to move axially.

* * * * *